(12) United States Patent
Jones et al.

(10) Patent No.: US 9,911,048 B2
(45) Date of Patent: Mar. 6, 2018

(54) STOCKING LEVEL INDICATION APPARATUS AND METHOD

(71) Applicant: Wal-Mart Stores, Inc., Bentonville, AR (US)

(72) Inventors: Nicholaus A. Jones, Fayetteville, AR (US); Matthew A. Jones, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 15/585,246

(22) Filed: May 3, 2017

(65) Prior Publication Data
US 2017/0323162 A1     Nov. 9, 2017

Related U.S. Application Data

(60) Provisional application No. 62/332,270, filed on May 5, 2016.

(51) Int. Cl.
| | |
|---|---|
| *H04N 7/18* | (2006.01) |
| *G06K 9/00* | (2006.01) |
| *A47F 5/00* | (2006.01) |
| *G06Q 10/08* | (2012.01) |
| *G01B 11/16* | (2006.01) |
| *G01G 19/387* | (2006.01) |

(52) U.S. Cl.
CPC ........ *G06K 9/00771* (2013.01); *A47F 5/0043* (2013.01); *G01B 11/16* (2013.01); *G06Q 10/087* (2013.01); *H04N 7/183* (2013.01); *G01G 19/387* (2013.01)

(58) Field of Classification Search
None
See application file for complete search history.

(56) References Cited

U.S. PATENT DOCUMENTS

| | | |
|---|---|---|
| 4,961,533 A | 10/1990 | Teller |
| 7,584,016 B2 | 9/2009 | Weaver |
| 8,656,784 B2 | 2/2014 | Ned |

(Continued)

FOREIGN PATENT DOCUMENTS

KR     20140136089     11/2014

OTHER PUBLICATIONS

"Keeping Warm with Nanotechnology: Aerogel Insulation"; http://www.azonano.com/article.aspx?ArticleID=3131; Jul. 1, 2016 ; 7 pages.

(Continued)

*Primary Examiner* — Andy Rao
*Assistant Examiner* — Tyler Edwards
(74) *Attorney, Agent, or Firm* — Fitch, Even, Tabin & Flannery LLP

(57) ABSTRACT

In some embodiments, systems, apparatuses, and methods are described herein including a shelf assembly that utilizes the accumulated weight of products stocked thereon to compress a compression member disposed within the assembly. An electronic imaging device can be mounted proximate to the assembly and can be oriented to capture an image of the compression member to determine whether a particular shelf needs to be restocked and avoid having to manipulate or remove products from a shelf to determine a current stock level.

21 Claims, 5 Drawing Sheets

(56) References Cited

U.S. PATENT DOCUMENTS

| | | |
|---|---|---|
| 8,695,878 B2 | 4/2014 | Burnside |
| 2005/0060246 A1* | 3/2005 | Lastinger ............ G06K 17/0022 |
| | | 705/28 |
| 2005/0086133 A1 | 4/2005 | Scherer |
| 2005/0093690 A1 | 5/2005 | Miglionico |
| 2005/0190072 A1* | 9/2005 | Brown ................. G06Q 10/087 |
| | | 340/6.1 |
| 2006/0071774 A1 | 4/2006 | Brown |
| 2014/0201041 A1* | 7/2014 | Meyer .................. G06Q 10/087 |
| | | 705/28 |
| 2014/0299389 A1* | 10/2014 | Coleman ............... G01L 1/2262 |
| | | 177/1 |

OTHER PUBLICATIONS

PCT; App. No. PCT/US2017/030354; International Search Report and Written Opinion dated Jul. 19, 2017.

* cited by examiner

STOCKING LEVEL INDICATION APPARATUS AND METHOD

CROSS-REFERENCE TO RELATED APPLICATIONS

This application claims the benefit of U.S. Provisional Application No. 62/332,270, filed May 5, 2016, which is hereby incorporated by reference herein in its entirety.

TECHNICAL FIELD

This invention relates generally to retail shelving and, more particularly, to stocking level indicating shelving assemblies.

BACKGROUND

Retail stores often utilize modular shelving units to display products for sale. It can be important to maintain an accurate count of inventory during operation of the store. Pursuant to this, associates often have to count products on the shelves. It can be difficult for associates to accurately determine a count of products on the shelves and, as such, one method to ensure an accurate count to remove all of the products from the shelves. Unfortunately, the associates must then restock the products on the shelves.

BRIEF DESCRIPTION OF THE DRAWINGS

Disclosed herein are embodiments of systems, apparatuses and methods pertaining to a shelving assembly that provides an indication of a stocking level of products on the shelving assembly. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to provide a visual indication of a level or number of products stocked on a shelf of a shelving unit. The visual indication is provided by virtue of an accumulated weight of products causing a visual compression of a compression member according to the weight. More specifically, a shelf assembly is described herein that utilizes the accumulated weight of products stocked thereon to compress a compression member disposed within the assembly. An electronic imaging device can be mounted proximate to the assembly and can be oriented to capture an image of the compression member to determine whether a particular shelf needs to be restocked. Accordingly, the assembly and electronic imaging device described herein advantageously avoids having to manipulate or remove products from a shelf to determine a current stock level and helps a retail location avoid being out of product on the shelf.

By some approaches, a control circuit can be configured to receive the image from the electronic imaging device and analyze the image to determine a current stock level. For example, the control circuit can be configured to associate a compression level of the compression member to a weight of the products on the assembly. Utilizing the approximate weight and the type of product stocked on the shelf, an approximate number of products on the shelf can be extrapolated.

Figure 1:
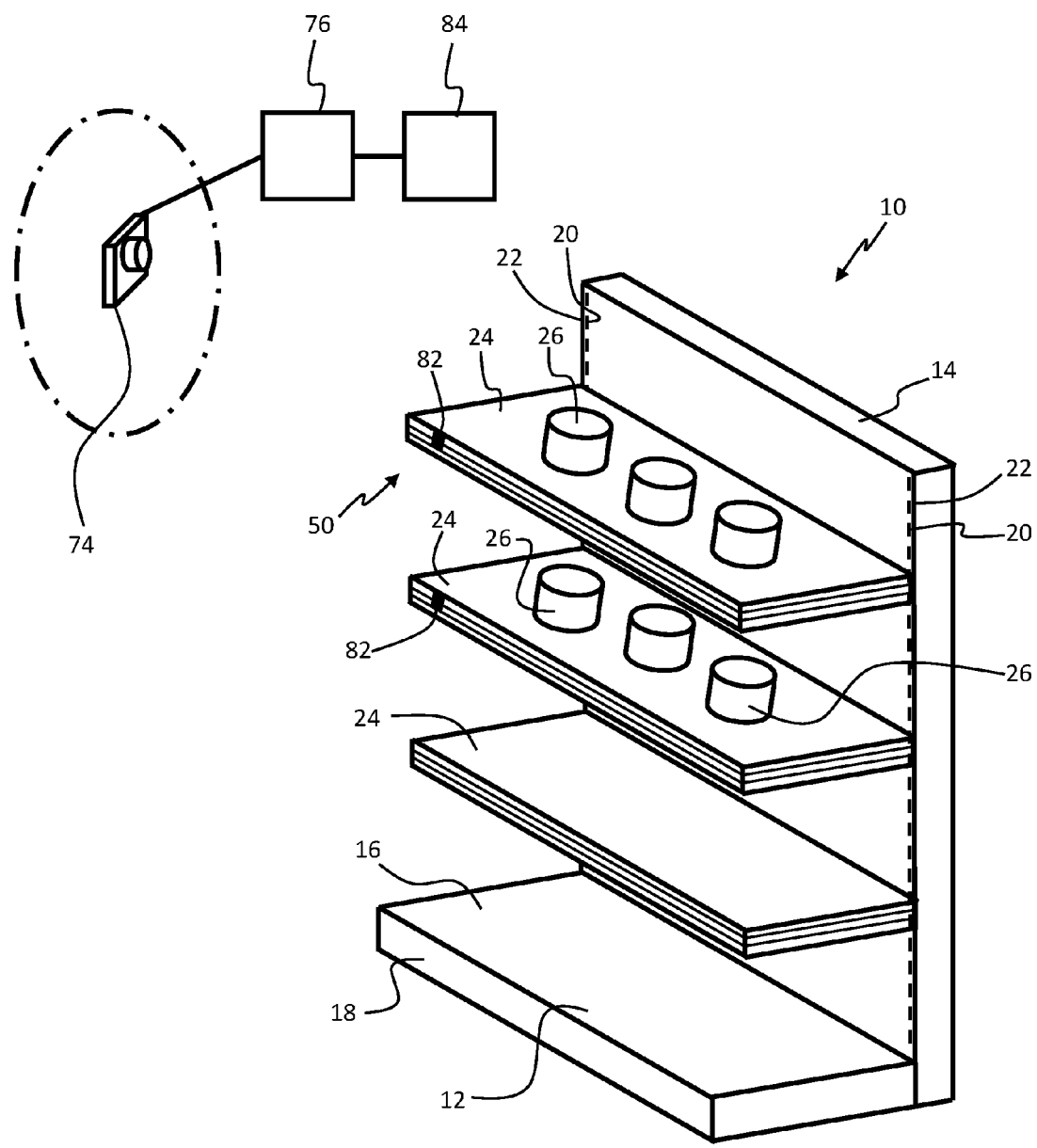
FIG. 1 is a schematic perspective view of a shelving unit having a stocking level assembly mounted thereto and an electronic imaging device oriented at the stocking level assembly in accordance with some embodiments.

An example shelving unit 10 is shown in FIG. 1. Based on a particular use, multiple shelving units 10 can be aligned in a row to produce an aisle in a retail location. The shelving unit 10 includes a base portion 12 and a back wall 14 extending upwardly therefrom. The base portion 12 can include a base deck 16 and a kick plate 18, as commonly configured. A plurality of shelf notches 20 are vertically disposed adjacent to lateral edges 22 of the back wall 14 to provide anchor points for shelves 24 mounted to the shelving unit 10. After the shelving unit 10 is assembled, associates can then stock products 26 on the shelves 24.

Figure 2:
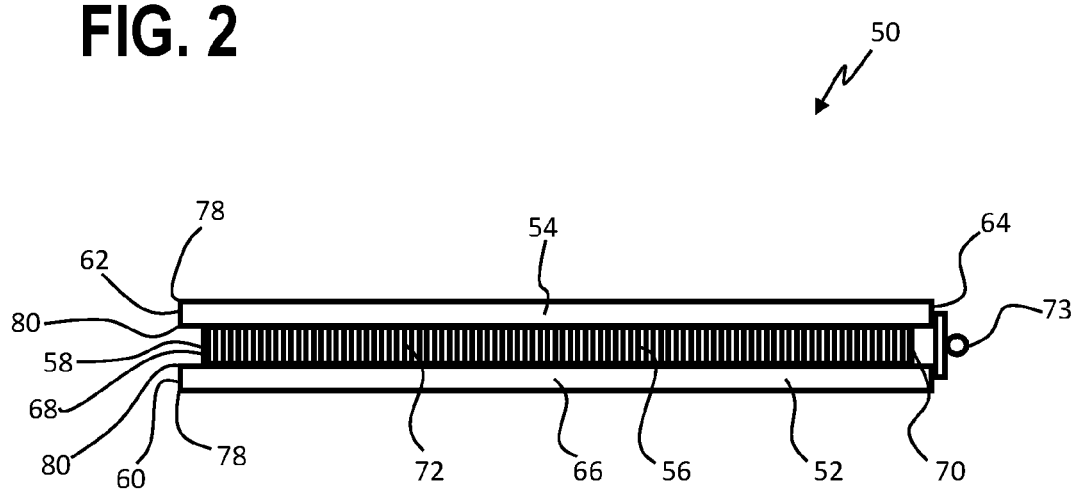
FIG. 2 is a side elevation view of the stocking level assembly of FIG. 1 in an uncompressed configuration in accordance with several embodiments.
Figure 3:
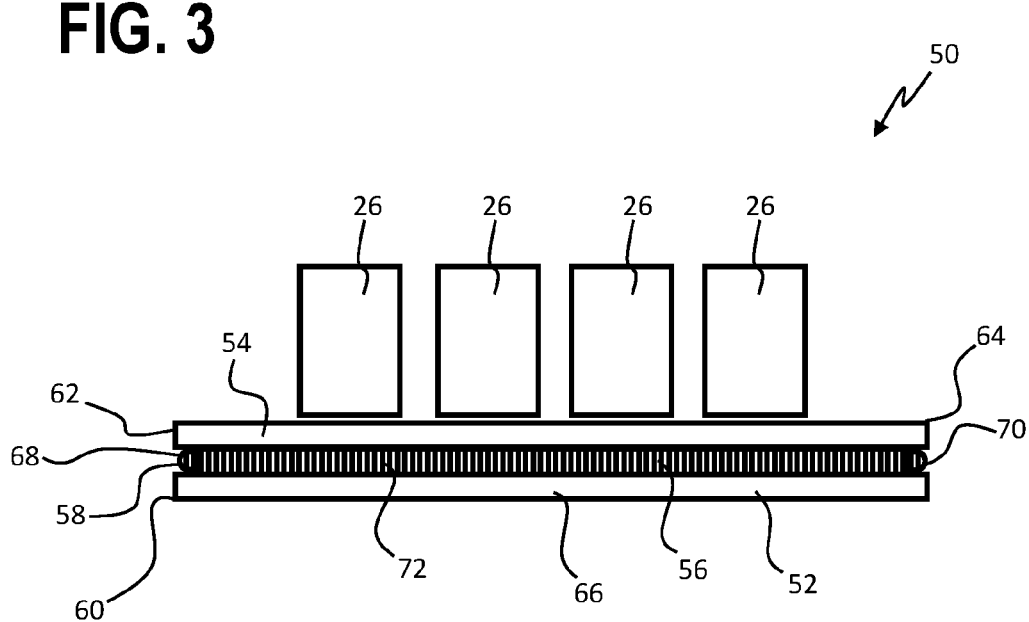
FIG. 3 is a side elevation view of the stocking level assembly of FIG. 1 in a compressed configuration in accordance with some embodiments.

If desired, as shown in FIGS. 1-3, one or more of the shelves 24 can include a stocking level indication assembly 50. The assembly 50 can be a shelf 24 configured to mount to the back wall 14 of the shelving unit 10 or can be an insert for a shelf 24 or disposed thereon. As shown, the assembly 50 includes rigid lower and upper shelf portions or members 52, 54 with a compression portion or member 56 disposed therebetween. The compression member 56 can be secured in the assembly, and to the shelf members 52, 54 thereof, by any suitable method, including adhesive, hardware, interlocking components, or the like. For example, the compression member 56 can be adhered to the upper and lower surfaces of the lower and upper shelf members 52, 54, respectively. The compression member 56 can have a first, base height corresponding to no products 26 being disposed on the assembly. Then, as products 26 are stocked on the assembly 50, the compression member 56 can be configured to compress at a known rate such that for a given weight on the assembly, the compression member 56 will have compressed a known amount between the lower and upper shelf members 52, 54. For example, the compression member can be made of any suitably compressible material, such as rubber, a polymer, or the like.

By some approaches, outer edges 58 of the compression member 56 can be recessed from adjacent outer edges 60 of the shelf members 52, 54. So configured, when the assembly is fully stocked and the compression member 56 is compressed, bulging of the compression member 56 as a result of the compression will not extend past the outer edges 60 of the shelf members 52, 54. By other approaches, one or more of the outer edges 58 of the compression member 56 can align with the corresponding outer edges 60 of the shelf members 52, 54.

As shown, in some forms, the lower and upper shelf members 52, 54 can each have a generally rectangular footprint where the outer edges 60 thereof include a front edge 62, a rear edge 64, and side edges 66 extending therebetween. Of course, other shapes and configurations can be utilized for particular applications or if desired.

If desired, the compression member 56 can have a footprint with a similar shape as that of the lower and upper shelf members 52, 54. For example, as shown, the compression member 56 can have a generally rectangular footprint where the outer edges 58 thereof include a front edge 68, a rear edge 70, and side edges 72 running therebetween. As discussed above, by one approach, the compression member 56 can have substantially the same footprint as the shelf members 52, 54 with the edges 62, 64, 66 of the shelf members 52, 54 generally aligned with the edges 68, 70, 72 of the compression member 56. By another approach, the compression member 56 can have a relatively smaller footprint so that the edges 68, 70, 72 thereof are recessed with respect to the edges 58, 60, 62 of the shelf members 52, 54.

By yet another approach, the compression member 56 need not span the entire surface area between the shelf members 52, 54. For example, the compression member 56 can be sized to 90%, 75%, or 50% of the surface area of the shelf members 52, 54. Pursuant to this, the compression member 56 can also have a differently shaped footprint than that of the shelf members 52, 54.

Figure 4:
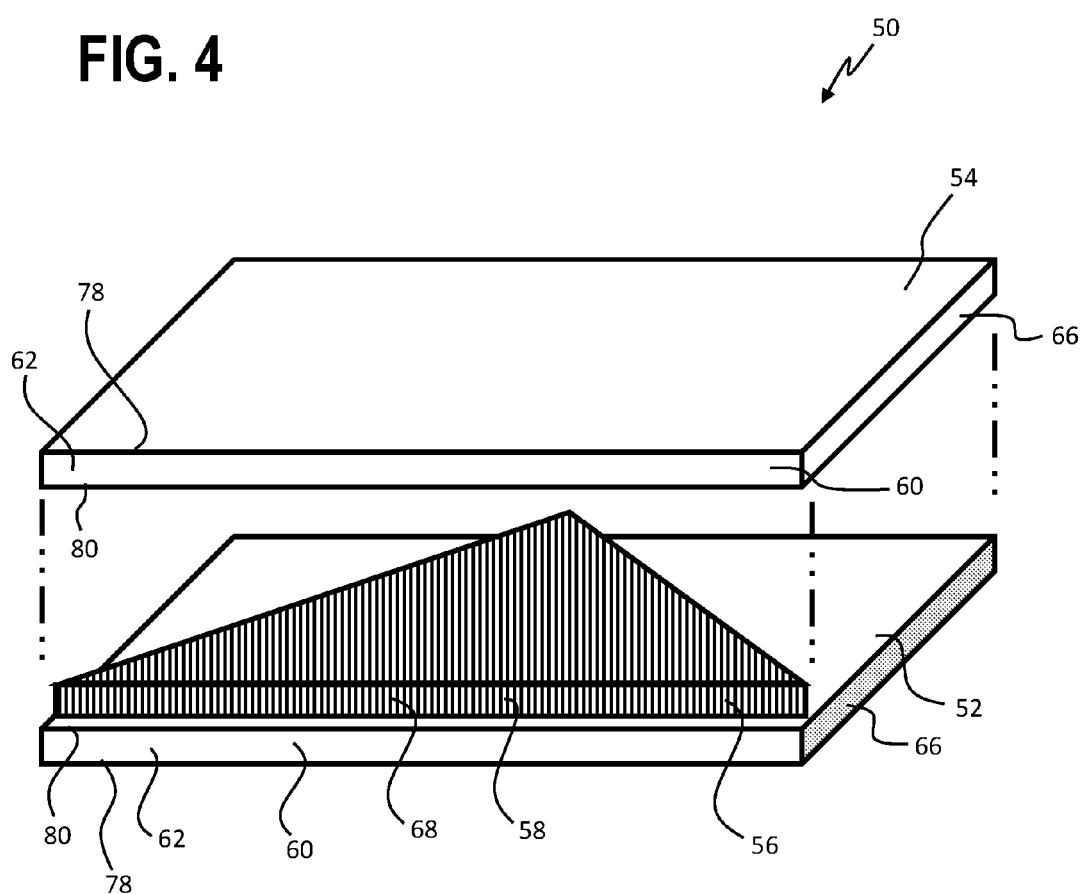
FIG. 4 is an exploded perspective view of a stocking level assembly having a triangular compression member in accordance with several embodiments.
Figure 5:
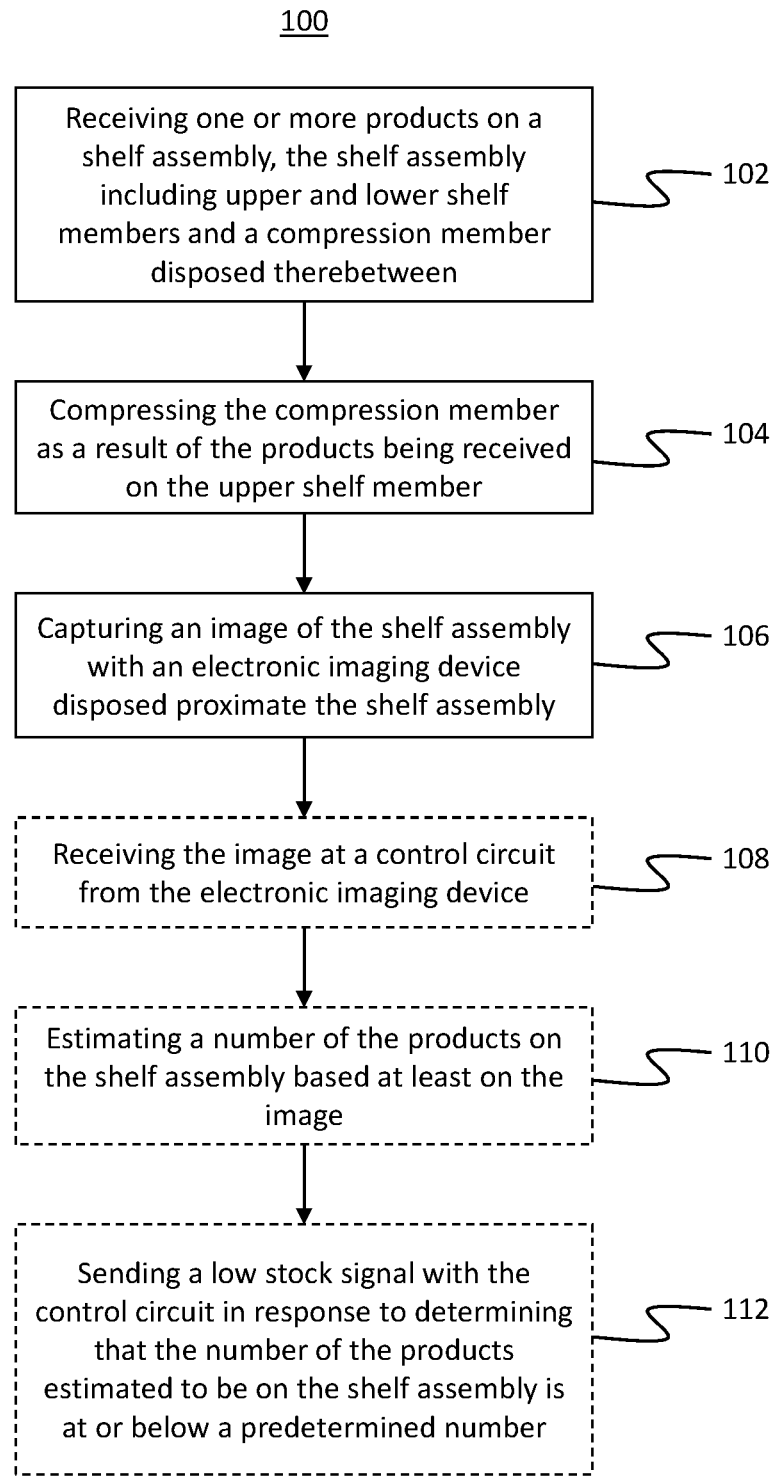
FIG. 5 is a flowchart in accordance with some embodiments.
Figure 6:
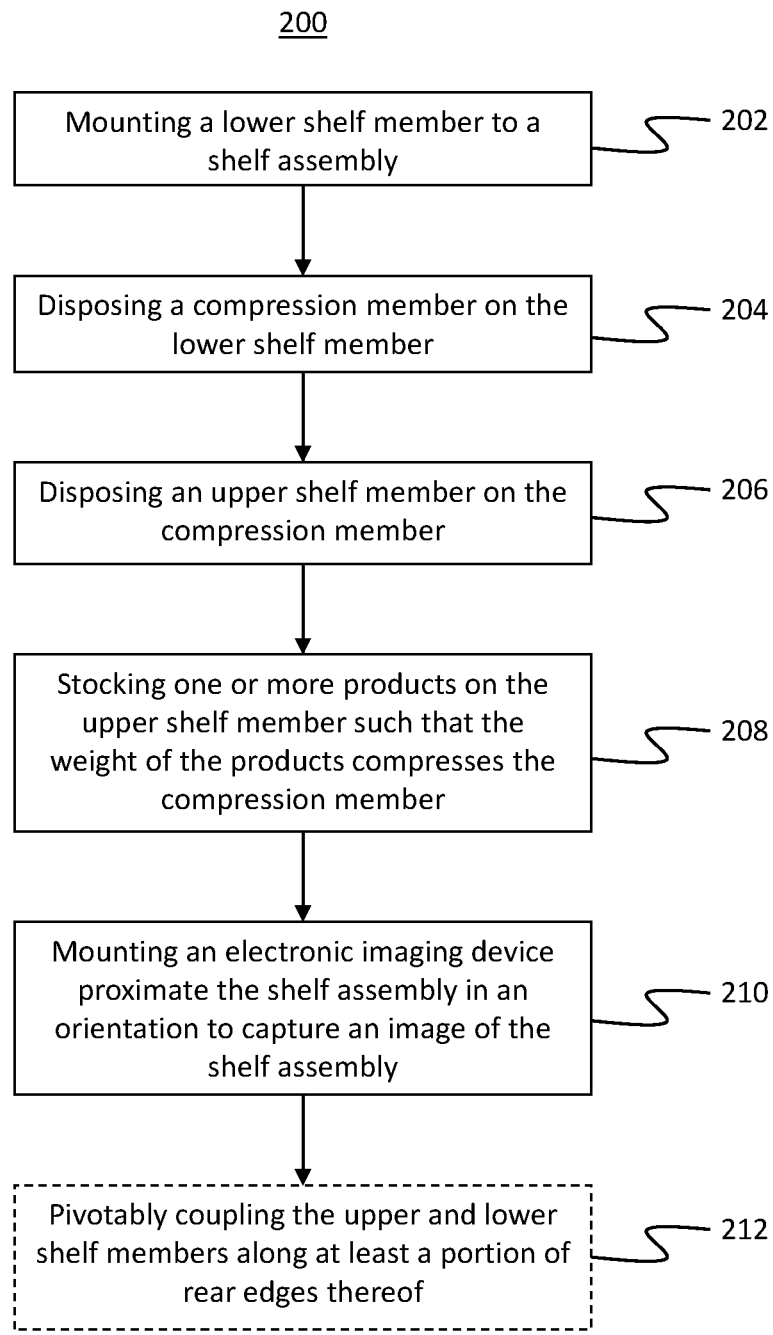
FIG. 6 is a flowchart in accordance with several embodiments.

In one form, as shown in FIG. 4, one of the outer edges 58 of the compression member 56 can be disposed along and adjacent to the front edge 62 of the shelf members 52, 54 with one or more of the other edges 58 spaced from other outer edges 60 of the shelf members 52, 54. So configured, the compression member 56 is visible along a majority or, if desired, substantially all, of the front edge 62 of the shelf members 52, 54. As shown, the compression member 56 of this form can be generally triangular. Of course, other shapes and configurations can be utilized, including curvilinear shapes. So disposed, the triangular compression member 56 extends rearwardly between the shelf members 52, 54 to a point adjacent to the rear edges 66 thereof.

If desired, and to provide additional stability to the assembly 50, the shelf members 52, 54 can be pivotally coupled along the rear edges 64 thereof with a hinge 73 or the like, such as along the entire length thereof or along portions thereof. So configured, the upper shelf member 54 can pivot with respect to the lower shelf member 52 along the rear edges 64 thereof and, therefore, can pivot to compress the compression member 56 disposed therebetween. Moreover, with the triangular compression member 56 described above, the shelf members 52, 54 of this form are stably assembled along the front and rear edges 62, 64 thereof.

If desired, the compression member 56 can be visually distinct with respect to the shelf members 52, 54. For example, the compression member 56 can have a different color, such as a bright color, including yellow, orange, red, or the like, a different pattern, such as striped, cross-checked, or the like, or combinations thereof.

As shown in FIG. 1, an electronic imaging device 74, such as a camera or the like, can be mounted adjacent to the assembly 50 to capture an image thereof including the compression member 56. By one approach, the imaging device 74 can be mounted proximate to the assembly 50. The imaging device 74 can be mounted to a fixed location, such as the shelving unit 10 itself, including to one of the shelves 24, a wall of the retail location, or other structure. With a fixed configuration, the imaging device 74 can be pivotably or slidably movable to capture images along a range so that the imaging device 74 can capture images of more than one assembly 50.

In another form, the imaging device 74 can be mounted to a mobile structure or assembly, such as a cart, robot, or the like. For example, the imaging device 74 can be configured to operate as a shopper moves a cart around the store or as a robot is programmed to move up and down aisles in the store.

Thereafter, the imaging device 74 can send the image to a computing device 76 having a control circuit therein over a wired connection or over any suitable network, utilizing radio communication, Bluetooth, WiFi, near field communication, or the like utilizing suitable receivers, transmitters, and/or transceivers. The computing device 76 can include a memory and may generally be any processor-based device such as one or more of a computer system, a server, a networked computer, a cloud-based server, etc. The control circuit 76 may comprise a central processing unit, a processor, a microprocessor, and the like. The control circuit 76 may be configured to execute computer-readable instructions stored on the memory. The memory may comprise volatile and/or non-volatile computer-readable storage memory and have stored upon it a set of computer readable instructions which, when executed by the control circuit 76, cause the system to perform operations as described herein.

The control circuit 76 receives the image and is configured to estimate a weight indicated by the assembly 50. For example, the control circuit 76 can analyze the assembly 50 in the image to determine or estimate a compression distance of the compression member 56. The control circuit 76 can achieve this by determining a distance between the shelf members 52, 54, such as between the outer or inner front edge corners 78, 80 thereof.

By one approach, the control circuit 76 can be calibrated to a particular product 26. For example, the control circuit 76 can receive an image from the imaging device 74 of the assembly 50 having no products 26 stocked thereon to establish a baseline measurement for a projection for the compression member 56. Next, the control circuit 76 can receive an image from the imaging device 74 of the assembly 50 in a fully stocked configuration to establish a top measurement for the projection for the compression member 56. The control circuit 76 can be provided with the products 26 intended for the assembly 50, such as through a remote database or server device 84 described below, to establish an intended number of products 26 and an intended weight for the fully stocked configuration. Identification of the baseline and fully stocked images can be provided from the remote server device 84 which can be configured to coordinate tasks, such as stocking and product location. So configured, the control circuit 76 can thereafter compare a subsequently received image, and the compression distance shown thereon, to the projection to determine an approximate weight and/or number of products 26 stocked on the assembly 50.

By another approach, the assembly 50 can include a scale 82 mounted thereto and visible to the imaging device 74. The scale 82 can be any object of known dimensions so that the scale 82 can be compared to the compression distance. For example, the scale 82 can be a label for the products 26 on the shelf 24 or a dedicated object. If desired, the scale 82 can be mounted to one of the shelf members 52, 54, such as overhanging the gap therebetween. Next, the control circuit 76 can be configured to estimate a total weight of products 26 on the assembly 50 based on the compression distance of the compression member 56, such as by referencing a table or the like.

The control circuit 76 can further be configured to access product location information, stored locally or on a remote database or server device 84. The product location information can identify the products 26 intended to be stocked on the assembly 50 and identify weight data of the identified products 26. From the weight of the products 26 that are intended to be stocked on the assembly 50 and the estimated weight, the control circuit 76 can estimate a number of products 26 on the assembly 50.

If desired, the control circuit 76 can further compare the estimated number of products 26 on the assembly 50 to a predetermined stock number, such as a number that would indicate a low stock level. In response to determining that the estimated number is at or below the predetermined stock number, the control circuit 76 can be configured to send out a low stock signal. The low stock signal can be sent or routed to any suitable recipients, such as to create tasks therefor, including devices for stocking associates, devices for ordering additional stock, and the like.

Additionally, the estimated weight and/or estimated number of products can be used by the control circuit 76 to generate warning signals. For example, if the estimates indicate that there is too much weight on the assembly 50, the control circuit 76 can be configured to send out a warning signal to suitable recipients to remove products 26 from the assembly 50. Moreover, if the estimates indicate an anomaly, such as a weight or number that do not reflect the products 26 intended to be stocked on the assembly 50, the control circuit 76 can be configured to send a warning signal to suitable recipients to check the shelving unit 10.

In some embodiments, a stock level indication assembly is described herein that includes upper and lower shelf members, a compression member disposed between the upper and lower shelf members, and an electronic imaging device proximate the upper and lower shelf members oriented and configured to capture an image of the compression member. The compression member of these embodiments can be configured to visibly compress in response to one or more products being stocked on the upper shelf member to provide a visual indication of the number of products stocked on the upper shelf member.

By several approaches, the stock level indication assembly can further include a control circuit operably coupled to the electronic imaging device. The control circuit can be configured to receive the image from the imaging device and estimate a number of the products on the shelf based at least on the image.

By further approaches, the control circuit can be configured to estimate the number of the products on the shelf by estimating a compression distance indicated in the image, estimating a weight of total products on the shelf based on the estimated compression distance, accessing product location information, and estimating a number of the products on the shelf based on the product location information and the estimated weight.

By further approaches, the control circuit can be configured to send a low stock signal in response to determining that the number of the products estimated to be on the shelf is at or below a predetermined number.

By further approaches, the control circuit can be configured to determine a lateral distribution of products on the upper shelf member based on a laterally angled compression of the compression member.

By some approaches, the upper and lower shelf members can have a generally rectangular footprint with front edges and the compression member can have a generally triangular footprint, where the compression member is disposed between the upper and lower shelf members with an edge thereof running adjacent to the front edges of the upper and lower members.

In several embodiments, a method for providing 100 a visual indication of stock level is described herein that includes receiving 102 one or more products on a shelf assembly. The shelf assembly can include upper and lower shelf members and a compression member disposed therebetween, where the compression member configured to visibly compress in response to one or more products being stocked on the upper shelf member to provide a visual indication of the number of products stocked on the upper shelf member. The method can further include compressing 104 the compression member as a result of the products being received on the upper shelf member and capturing 106 an image of the shelf assembly with an electronic imaging device disposed proximate the shelf assembly.

By some approaches, the method can further include receiving 108 the image at a control circuit from the electronic imaging device and estimating 110 a number of the products on the shelf assembly based at least on the image.

By further approaches, estimating 110 the number of products on the shelf assembly can include estimating a compression distance indicated in the image, estimating a weight of the products based on the estimated compression distance, accessing product location information, and estimating a number of the products on the shelf assembly with the control circuit based on the product location information and the estimated weight.

By yet further approaches, the method can include sending 112 a low stock signal with the control circuit in response to determining that the number of the products estimated to be on the shelf assembly is at or below a predetermined number.

In some embodiments, a method for installing 200 a stock level indication assembly is described herein that includes mounting 202 a lower shelf member to a shelf assembly, disposing 204 a compression member on the lower shelf member, disposing 206 an upper shelf member on the compression member, stocking 208 one or more products on the upper shelf member such that the weight of the products compresses the compression member, and mounting 210 an electronic imaging device proximate the shelf assembly in an orientation to capture an image of the shelf assembly, the image configured to provide an indication of the number of products stocked on the upper shelf member.

By several approaches, disposing 204 the compression member on the lower shelf member can include disposing the compression member on the lower shelf member such that a front edge of the compression member is recessed from a front edge of the lower shelf member and disposing the upper shelf member on the compression member can include disposing the upper shelf member on the compression member such that the front edge of the compression member is recessed from a front edge of the upper shelf member.

By some approaches, the method can further include pivotably 212 coupling the upper and lower shelf members along at least a portion of rear edges thereof.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A stock level indication assembly for a retail product storage structure, the stock level indication assembly comprising:
    upper and lower shelf members;
    a compression member disposed between the upper and lower shelf members, the compression member configured to visibly compress in response to one or more products being stocked on the upper shelf member to provide a visual indication of the number of products stocked on the upper shelf member;
    an electronic imaging device proximate the upper and lower shelf members oriented and configured to capture an image of the compression member.

2. The stock level indication assembly of claim 1, further comprising a control circuit operably coupled to the electronic imaging device and configured to receive the image therefrom, the control circuit configured to estimate a number of the products on the shelf based at least on the image.

3. The stock level indication assembly of claim 2, wherein the control circuit is configured to estimate the number of the products on the shelf by estimating a compression distance indicated in the image, estimating a weight of total products on the shelf based on the estimated compression distance, accessing product location information, and estimating a number of the products on the shelf based on the product location information and the estimated weight.

4. The stock level indication assembly of claim 2, wherein the control circuit is further configured to send a low stock signal in response to determining that the number of the products estimated to be on the shelf is at or below a predetermined number.

5. The stock level indication assembly of claim 2, wherein the control circuit is further configured to determine a lateral distribution of products on the upper shelf member based on a laterally angled compression of the compression member.

6. The stock level indication assembly of claim 1, wherein the electronic imaging device is mounted to a mobile assembly.

7. The stock level indication assembly of claim 1, wherein the upper and lower shelf members include front edges and the compression member is disposed between upper and lower shelf members so that a front edge thereof is recessed with respect to the front edges of the upper and lower shelf members such that bulging of the compression member after stocking does not extend past the front edges of the upper and lower shelf members.

8. The stock level indication assembly of claim 1, wherein the compression member is adhered to the upper and lower shelf members along upper and lower surfaces thereof.

9. The stock level indication assembly of claim 1, wherein the compression member has a different color or surface pattern than the upper and lower shelf members.

10. The stock level indication assembly of claim 1, further comprising a scale on at least one of the upper and lower shelf members that is configured to provide a reference for compression distance in the image.

11. The stock level indication assembly of claim 1, wherein the upper and lower shelf members have a generally rectangular footprint with front edges and the compression member has a generally triangular footprint, the compression member being disposed between the upper and lower shelf members with an edge thereof running adjacent to the front edges of the upper and lower members.

12. The stock level indication assembly of claim 11, wherein the upper and lower shelf members are pivotably connected along rear edges thereof.

13. A method for providing a visual indication of stock level on a retail product storage structure, the method comprising:
    receiving one or more products on a shelf assembly, the shelf assembly including upper and lower shelf members and a compression member disposed therebetween, the compression member configured to visibly compress in response to one or more products being stocked on the upper shelf member to provide a visual indication of the number of products stocked on the upper shelf member;
    compressing the compression member as a result of the products being received on the upper shelf member;
    capturing an image of the shelf assembly with an electronic imaging device disposed proximate the shelf assembly.

14. The method of claim 13, further comprising:
    receiving the image at a control circuit from the electronic imaging device; and
    estimating a number of the products on the shelf assembly based at least on the image.

15. The method of claim 14, wherein estimating the number of products on the shelf assembly comprises:
    estimating a compression distance indicated in the image;
    estimating a weight of the products based on the estimated compression distance.
    accessing product location information; and
    estimating a number of the products on the shelf assembly with the control circuit based on the product location information and the estimated weight.

16. The method of claim 15, further comprising sending a low stock signal with the control circuit in response to determining that the number of the products estimated to be on the shelf assembly is at or below a predetermined number.

17. A method for installing a stock level indication assembly for a retail product storage structure, the method comprising:
    mounting a lower shelf member to a shelf assembly;
    disposing a compression member on the lower shelf member;
    disposing an upper shelf member on the compression member;
    stocking one or more products on the upper shelf member such that the weight of the products compresses the compression member; and
    mounting an electronic imaging device proximate the shelf assembly in an orientation to capture an image of the shelf assembly, the image configured to provide an indication of the number of products stocked on the upper shelf member.

18. The method of claim 17, wherein disposing the compression member on the lower shelf member comprises disposing the compression member on the lower shelf member such that a front edge of the compression member is recessed from a front edge of the lower shelf member; and disposing the upper shelf member on the compression member comprises disposing the upper shelf member on the compression member such that the front edge of the compression member is recessed from a front edge of the upper shelf member.

19. The method of claim 17, further comprising adhering the compression member to the upper and lower shelf members.

20. The method of claim 17, further comprising pivotably coupling the upper and lower shelf members along at least a portion of rear edges thereof.

21. The method of claim 17, further comprising installing a scale on the shelf assembly, the scale being configured to provide a reference for compression distance in the image.

* * * * *